United States Patent [19]

Wright

[11] 4,108,802

[45] Aug. 22, 1978

[54] QUATERNARY AMMONIUM POLYMERS AND PHOTOGRAPHIC MATERIALS CONTAINING SAME

[75] Inventor: Peter John Wright, Ilford, England

[73] Assignee: CIBA-GEIGY AG, Basel, Switzerland

[21] Appl. No.: 688,516

[22] Filed: May 20, 1976

[30] Foreign Application Priority Data

Jun. 4, 1975 [GB] United Kingdom ............... 24131/75

[51] Int. Cl.$^2$ ..................... C08F 22/40; C08F 26/02
[52] U.S. Cl. ................................ 526/17; 96/84 A; 526/9; 526/11; 526/258; 526/263; 526/265; 526/292; 526/304; 526/310; 526/312; 526/23; 526/56; 526/46; 528/423; 96/84 A
[58] Field of Search ................ 526/9, 11, 23, 46, 17, 526/258, 263, 312, 310, 265; 260/2 R

[56] References Cited

U.S. PATENT DOCUMENTS

| | | | |
|---|---|---|---|
| 3,444,138 | 5/1969 | Williams | 96/84 A |
| 3,515,707 | 6/1970 | Reimschuessel | 526/312 X |
| 3,625,694 | 12/1971 | Cohen | 96/84 A |
| 3,740,228 | 6/1973 | Ohlschlager | 96/84 A |
| 3,741,768 | 6/1973 | Van Paesschen | 96/114 |
| 3,938,999 | 2/1976 | Yoneyama | 96/84 R |

*Primary Examiner*—Christopher Henderson, Jr.
*Attorney, Agent, or Firm*—Burgess, Dinklage & Sprung

[57] ABSTRACT

Polymers comprising repeating units which contain groupings of the formula —$CH_2OOCR_1$, wherein $R_1$ is hydrogen or alkyl with 1 to 14 carbon atoms and the —$CH_2$—group is directly bonded to a quaternary nitrogen atom. The polymers are useful in photographic materials as mordants for anionic compounds especially for anionic dyes.

8 Claims, No Drawings

QUATERNARY AMMONIUM POLYMERS AND PHOTOGRAPHIC MATERIALS CONTAINING SAME

BACKGROUND OF THE INVENTION

This invention relates to novel polymeric material which is capable of mordanting anionic compounds and in particular dyes. This invention relates also to material and in particular to photographic material which comprises a layer having present therein a combination of an anionic compound mordanted by the novel polymeric material.

It is often required to include in light-sensitive photographic material one or more coloured layers. The object of these layers is to absorb unwanted light either by acting as filter layers which selectively absorb light of certain wave lengths and allow the remaining light to pass or to act as anti-halation layers. Anti-halation layers act by absorbing all the light which reaches them and thus prevent the light being reflected back into superposed light-sensitive layers. However once the light-sensitive material has been exposed it is required that the coloured layers be decolourised before or during the processing of the image so that the colour of the image is not distorted.

Such coloured layers often comprise a dye attached to a mordant compound the combination of dye and mordant being present in a binder layer which is very often gelatin. The coloured layer can be decolourised by removing the coloured layer entirely and this is often done when the coloured layer is an anti-halation backing layer. However filter layers are usually placed between image layers and thus cannot be removed without removing the superposed image layer. Further it is becoming a common practice in photosensitive materials, and in particular microfilm, to have an anti-halation under-layer, which layer is coated on the photobase under the image producing layer or layers. In such circumstance also it is impossible to remove the coloured layer. Thus there are left the possibilities of decolourising the coloured layer by removing the combination of dye plus mordant from the layer, rendering the dye colourless by chemical reaction or freeing the dye from the mordant by chemical reaction. The first of these alternatives has been found to be quite impractical because it is required that the mordant be substantive to the binder of the layer in order to obtain a uniform coloured layer during coating of the layer. The second alternative has been practised and to some extent is still practised; in fact sulphite which is a constituent of most developing solutions will bleach most of the anionic dyes used in coloured layers in photographic materials. However this bleaching action is slow and often incomplete and furthermore an undesirable yellow stain often results. Thus increasing attention has been paid to the third alternative and a number of mordant plus releasable dye combinations have been proposed. Most of these combinations employ so-called alkali-release mordants. When layers containing the combination of an anionic dye and an alkali-release mordant are treated with an alkaline solution the dye is released. The requirements for a suitable alkali-release mordant are:

(1) the anionic dye must be firmly bound to the mordant under all conditions except when the layer containing the mordant is treated with an alkaline solution, (2) when the layer containing the anionic dye plus mordant combination is treated with an alkaline solution the dye must be released completely and rapidly from the mordant, (3) the mordant and the mordant-dye combination must be resistant to diffusion in or from the binder of the layer in which the mordant is present, (4) the mordant must be water-dispersible and compatible with the binder of the layer which is often gelatin.

When the alkali-release mordant is to be used in a layer in photographic material there are two other requirements:

(5) the mordant must not affect to any great extent the photographic properties of the photographic layer or layers with which it is adjacent, (6) the mordant must not take up and retain the silver halide fixing agent used in the processing of the photographic material because such retention yields, on prolonged storage, a brown stain.

SUMMARY OF THE INVENTION

We have now found that the novel alkali-release mordants of this invention fulfil to a great extent the above listed requirements.

DETAILED DESCRIPTION OF THE INVENTION

According to the present invention there is provided polymeric material which comprises repeating units containing structural elements of the formula

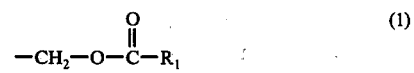

wherein $R_1$ is hydrogen or alkyl containing from 1 to 14 carbon atoms and the —$CH_2$-group is directly bonded to a quaternary nitorgen atom.

The polymeric material is either a homopolymer or a copolymer. According to one embodiment of the present invention there is provided polymeric material which comprises repeating units containing groupings of the formula

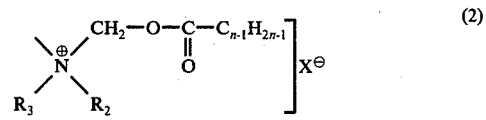

wherein $n$ is an integer of 1 to 15, X represents an anion, $R_2$ and $R_3$ each represents alkyl containing from 1 to 7 carbon atoms and the quaternary nitrogen is bound either directly or by a bridge member to the polymer chain.

According to another embodiment of the present invention there is provided polymeric material which comprises repeating units containing groupings of the formula

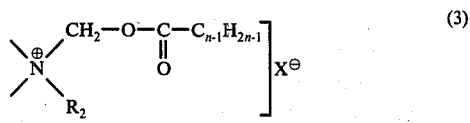

wherein n, $R_2$ and X have the meaning assigned to them and the quaternary nitrogen atom is a member of a ring which ring is linked to the polymer backbone or itself forms part of the polymer backbone.

According to a further embodiment of the present invention there is provided polymeric material which comprises repeating units containing groupings of the formula

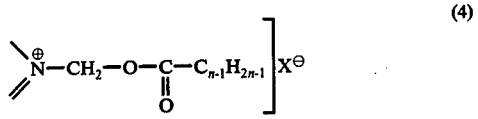

(4)

wherein $n$ and X have the meaning assigned to them and the quaternary nitrogen atom is a member of an optionally substituted aromatic ring which is linked directly or by a bridge member to the backbone of the polymer.

According to yet another embodiment of the present invention there is provided polymeric material which comprises repeating units containing groupings of the formula

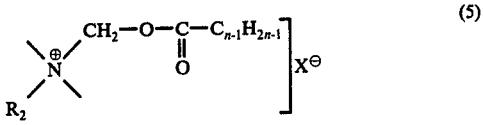

(5)

wherein $n$, $R_2$ and X have the meaning assigned to them and the quaternary nitrogen atom forms part of the polymer backbone.

According to yet a further embodiment of the present invention there is provided polymeric material which comprises repeating units containing groupings of the formula

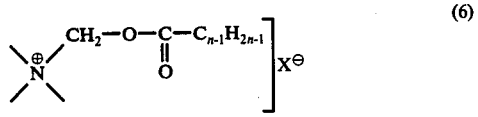

(6)

wherein $n$ and X have the meanings assigned to them and the quaternary nitrogen atom on the one hand is a member of a ring which forms part of the polymer backbone and on the other hand is bonded to an open chained radical which also forms part of the backbone.

Preferably in the above formulae (1) to (6) $R_1$ is hydrogen or $n$ is 1. Also preferably in the above formulae (1) to (6) X is a chloride or bromide ion.

Examples of alkyl groups which $R_2$ and $R_3$ may represent are methyl, ethyl, n-propyl, iso-propyl, n-butyl, tertiary butyl, n-hexyl and n-heptyl. Preferred are alkyl groups containing 1 to 4 carbon atoms; especially the methyl group.

Examples of ring systems in formula (3) are morpholine and piperidine.

An example of an aromatic ring system in formula (4) is pyridine.

An example of polymeric material wherein the repeating units contain a quaternary nitrogen atom according to the grouping of formula (4) which nitrogen atom is covalently bonded by a bridge member to the atoms forming the backbone of the polymer is represented by the formula

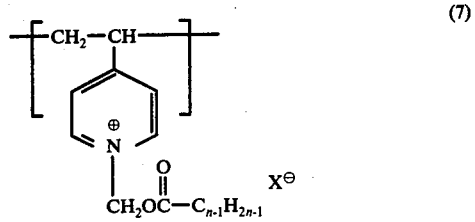

(7)

wherein X and $n$ have the meanings assigned to them above.

An example of polymeric material wherein the quaternary nitrogen atom in the grouping of formula (2) is directly covalently bonded to the atoms forming the backbone of the polymer is polymeric material derived from N-vinyl dialkylamine. The repeating monomeric units having the general formula

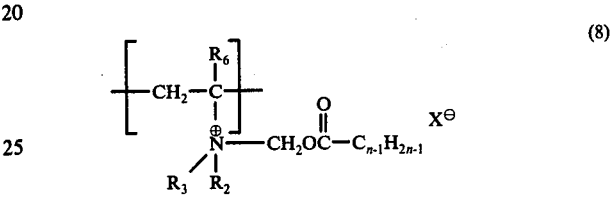

(8)

wherein $R_2$, $R_3$, X and n have the meanings assigned to them above and $R_6$ is hydrogen or $-COR_7$ wherein $R_7$ is hydroxy, amino, lower alkyl or lower alkoxy.

Most preferably the polymeric materials which contain monomeric units of formula (8) are copolymers. Suitable comonomeric units present in the copolymers are those derived from vinyl alcohol and/or vinyl sulphonate.

An example of polymeric material wherein the quaternary nitrogen atom of the grouping of formula (2) is covalently bonded to the atoms forming the backbone of the polymer by a link which includes at least one methylene group is polymeric material which contains at least some repeating monomeric units having the general formula (9)

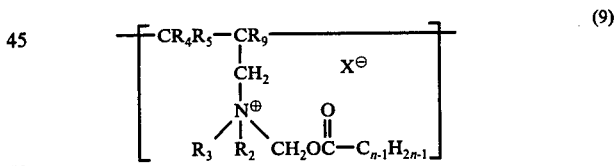

(9)

wherein $R_4$ and $R_5$ each represent hydrogen or alkyl, substituted alkyl, aryl or substituted aryl, $R_9$ is hydrogen or alkyl, substituted alkyl, aryl or substituted aryl, cyano or carbalkoxy and $R_2$, $R_3$, X and $n$ have the meanings assigned to them above.

Preferably in formula (9) each of $R_4$ and $R_5$ are hydrogen atoms or one is hydrogen and the other is unsubstituted alkyl having from 1 to 6 carbon atoms. Preferably in formula (9) $R_9$ is other than hydrogen and is most preferably cyano, methyl or ethyl.

Another example of polymeric material wherein the quaternary nitrogen atom of the grouping of formula (2) is covalently bonded to the atoms forming the backbone of the polymer by a link which includes at least one methylene group is polymeric material derived from vinyl esters which contains at least some repeating units having the general formula

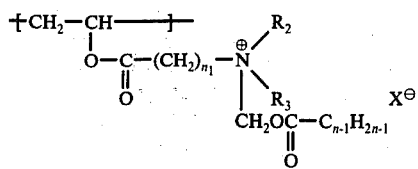

(10)

wherein $R_2$, $R_3$, X and $n$ having the meanings assigned to them above and $n_1$ is 1 to 4.

An especially useful class of polymeric material wherein the quaternary ammonium grouping of formula (2) is covalently bonded to the atoms forming the backbone of the polymer by a link which includes at least one methylene group is polymeric material derived from copolymers which comprise maleimide.

One example of such a copolymer contains at least some repeating units having the general formula

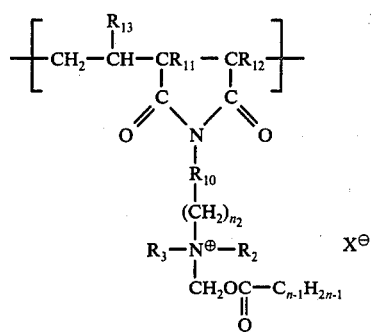

(11)

wherein $R_2$, $R_3$, X and $n$ have the meanings assigned to them above and $R_{10}$ is a linking group, $R_{11}$ and $R_{12}$ are each hydrogen or lower alkyl, $R_{13}$ is hydrogen, aryl, alkyl or —$OR_{14}$ wherein $R_{14}$ is alkyl or aryl and $n_2$ is 1 to 6.

Examples of suitable linking groups $R_{10}$ are groups of the formulae —C(O)—NH—, —NH—C(O)—NH, —C(O)—O— and —CH$_2$—CHOH—.

Since maleimide itself cannot easily be homopolymerised preferably the maleimide units are present in equal proportions with other monomers represented in formula (11) by —CH$_2$—CHR$_{13}$—. If $R_{13}$ is hydrogen the comonomer is ethylene and if it is phenyl it is styrene.

Another example of a copolymer containing maleimide units is a copolymer which comprises at least some repeating units having the general formula

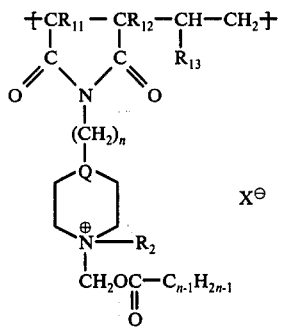

(12)

wherein $R_2$, $R_{11}$, $R_{12}$, $R_{13}$, X and n have the meanings assigned to them above, Q is a nitrogen atom, —CH— or —N⊕$R_{14}$— wherein $R_{14}$ is lower alkyl and there is another anion X⊖. The quaternary grouping in this case is of the general formula (3).

Another particularly useful class of polymeric material wherein the quaternary nitrogen atom of the grouping of formula (2) is covalently bonded to the atoms forming the backbone of the polymer by a link which includes at least one methylene group is polymeric material derived from methacrylic acid or methacrylamide which contains at least some repeating monomeric units having the general formula

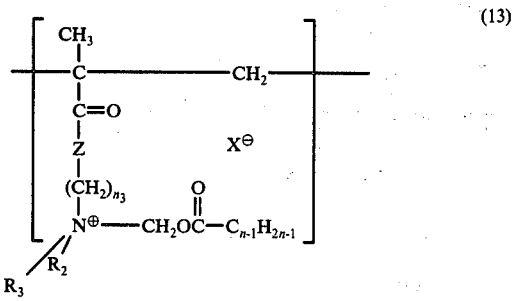

(13)

wherein $R_2$, $R_3$, X and n have the meanings assigned to them above and Z is —O— or —NH— and $n_3$ is 1 or 2.

Most preferably the polymeric material which contains units of formula (13) is a copolymer which comprises also units derived from styrene.

An example of polymeric material wherein the quaternary nitrogen atom of the grouping of formula (2) is covalently bonded to the atoms forming the backbone of the polymer by a linking group which comprises a phenyl link is a polymeric material derived from polyvinyl acetal which contains at least some repeating monomeric units having the general formula:

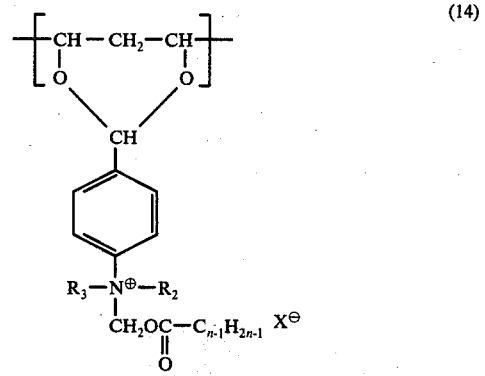

(14)

wherein $R_2$, $R_3$, X and $n$ have the meanings assigned to them above.

An example of a polymeric material wherein the quaternary nitrogen atom of the grouping of formula (3) is part of the backbone chain of the polymer is material derived from polypiperidine which comprises at least some repeating monomeric units having the general formula

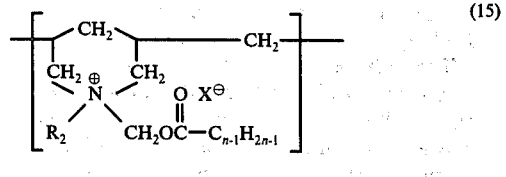

(15)

wherein $R_2$, X and n have the meanings assigned to them above. Suitable polymers are also those containing the repeating units according to formula (15) together with units derived from acrylic or methacrylic acid or the derivatives thereof such as amides or esters.

An example of a polymeric material wherein the quaternary nitrogen atom of the grouping of formula (5) is part of the backbone of the polymer is material derived from poly [linear hexamethylene-bis-methylamino-trimethylene] which comprises at least some repeating monomeric units having the general formula

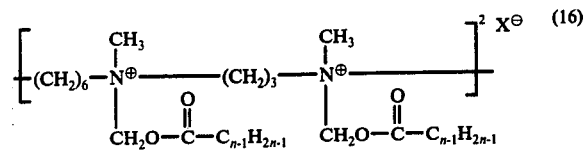

wherein X and n have the meanings assigned to them above.

An example of a polymeric material wherein the quaternary nitrogen atom of the grouping of formula (6) is part of the backbone of the polymer is material derived from polyalkylene piperazine which comprises at least some repeating monomeric units having the general formula

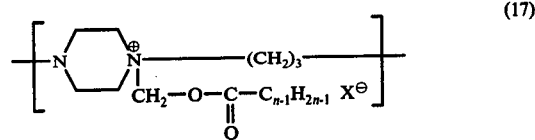

wherein X and $n$ have the meanings assigned to them above.

The polymeric material of the present invention which contains repeating monomeric units as set forth in formulae (7) to (17) may be prepared from the corresponding homopolymers or copolymers containing at least some recurring tertiary amino groups by reaction with a halomethyl ester of an aliphatic carboxylic acid of the general formula

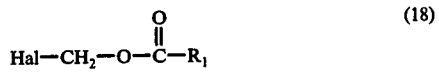

wherein $R_1$ has the meaning assigned to it above.

The preparation of the compound of formula (18) is described by Euranto in Ann. Univ. Turkueneis Series A, 131 1959.

These corresponding homopolymers and copolymers which contain repeating monomeric units are set forth in formulae (7) to (17) wherein the appendant group is a tertiary amino group and a quaternary ammonium group which however does not contain a $R_1COOCH_2$-group are all known compounds.

The polymeric materials for the present invention are very good mordants for anionic dyes and in particular when it is required that the dyes are present in a photographic layer during exposure of the material but can be discharged from the layer during processing.

The polymeric materials of the present invention are compatible with binders most usually used in photographic layers and in particular with gelatin. Further they are substantive to such layers. When anionic dyes are mordanted to the polymeric materials of the present invention they are firmly held by the polymeric material and thus when the polymeric materials of the present invention having an anionic dye mordanted thereto are dispersed in a binder for example gelatin and the binder is coated as a layer in photographic material the dye will remain substantive to that layer during the whole coating and production process. However, when after exposure, the photographic material containing a layer comprising the anionic dye plus mordant which is a polymeric material according to the present invention, is processed in an alkaline processing bath, e.g. the developer bath the dye is liberated from the mordant and bleeds out of the material into the alkaline processing bath. The liberation of the anionic dye from the polymeric mordant occurs very quickly and substantially all the dye is liberated leaving virtually no residual colour or stain due to the dye in the photographic material.

The mechanism whereby the polymeric mordants of the present invention are able to release a mordanted dye so quickly and completely when subjected to an alkaline processing bath is not completely clear. However sometimes it appears to involve the formation of formaldehyde.

Therefore according to another aspect of the present invention there is provided the combination of an anionic dye mordanted by a polymeric material which is a homopolymer or copolymer comprising a quaternary ammonium grouping of any one of the general formulae (1) to (6) hereinbefore set forth.

Usually the combination of anionic dye and polymeric material as just defined is present dispersed in a colloid binder. Often the said colloid layer containing dispersed therein the combination of an anionic dye and polymeric material is present as a layer in photographic material.

Therefore according to another aspect of the present invention there is provided photographic material which comprises at least one layer consisting of a colloid material having dispersed therein the combination of an anionic dye and a polymeric material which is a homopolymer or copolymer comprising a quaternary ammonium grouping of any one of the general formulae (1) to (6) as hereinbefore set forth.

Most preferably in this aspect of the present invention the colloid material is gelatin or a mixture of gelatin and at least one compatible colloid.

In this aspect of the present invention the layer in the photographic material may be an interlayer between two photosensitive layers. In this case the anionic dye is often a filter dye or an acutance dye. Examples of suitable anionic filter or acutance dyes are oxonol dyes for example the yellow filter dye of the formula

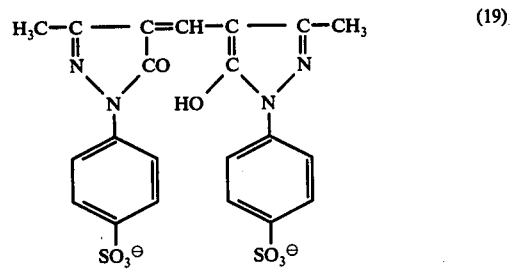

and the acutance dye derived from rubazonic acid which has the formula

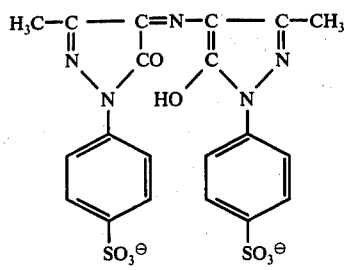
(20)

Another class of anionic filter dyes are formazan dyes for example the yellow formazan dye which has the formula

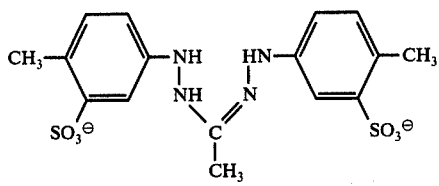
(21)

Alternatively the layer in the photographic material may be an antihalation layer. This antihalation layer may be coated on the film base on the reverse side to the photosensitive layer or layers or it may be coated on the film base on the same side as and beneath the photosensitive layer or layers.

Examples of suitable anti-halation dyes are acid substituted triphenylmethane dyes for example pencil green which has the formula

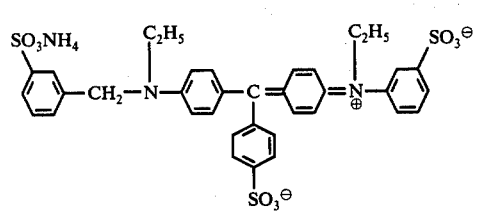
(22)

Other suitable anionic dyes suitable for use in antihalation layers are 1-phenyl-3-substituted-5-pyrazolones, for example the dye of formula

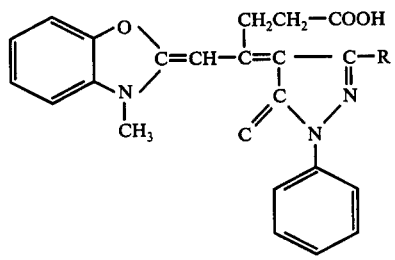
(23)

Other anionic dyes suitable for use in anti-halation layers are certain open-chain polymethine dyes for example the dye of formula

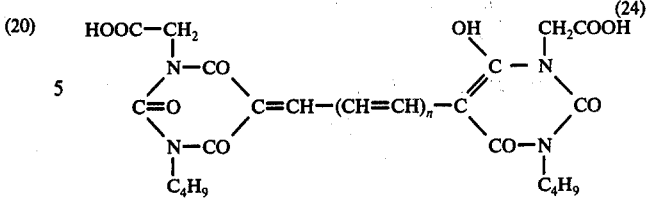
(24)

A particular advantage of the polymeric materials according to the present invention when incorporated into photographic material is that once the quaternary ammonium group as shown in formalue (1) to (6) as hereinbefore set forth has been destroyed thiosulphate and other ions used to fix silver salts are not retained by the mordant. When thiosulphate ions are retained in the layers of photographic material a brown stain is produced on long storage and often the silver image becomes degraded. This often happens when other mordants are used.

So that the polymeric materials of the present invention should be non-diffusing in the colloid material layer preferably they should have an average molecular weight within the range 5000 to 50000.

The following Examples will serve to illustrate the invention.

EXAMPLE 1

Preparation of Polymer I

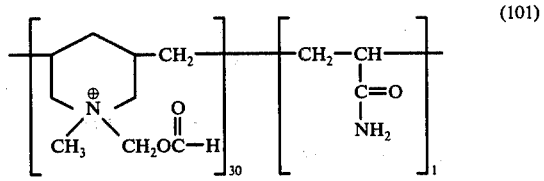
(101)

N-methyldiallylamine hydrochloride (DAMA-H Cl) was prepared by the method described by Harada and Arai in Die Makromolekulare Chemie 107 (1967), p 79–80. A copolymer with acrylamide was prepared by heating the following mixture at 80° C for 72 hours.

40 g D.A.M.A. -HCl
20 ml Distilled water
1.2 ml tert-Butyl Hydroperoxide
0.8 g Acrylamide The resultant polymer was dissolved in methanol and precipitated in acetone. The intrinsic viscosity of the polymer after drying under vacuo was 0.47. The polymer was then converted to the tertiary amino form by dissolving the above product in 20 ml of distilled water and neutralising the hydrogen chloride with normal sodium hydroxide. The precipitated polymer was purified by dissolving in methanol and precipitating it with acetone.

The thus prepared polymer was quaternised with chloromethyl formate in the following manner: the polymer (11.1 g, equivalent to 0.1 mol) was dissolved in sodium-dried, redistilled dioxane (200 ml). The stirred solution was cooled to 10° C in an ice/water bath. A solution of chloromethyl formate (10.4 g 10% excess) in 50 ml dioxane was added over a period of 1 hour. The precipitated quaternary compound was then filtered off and washed with dry diethyl ether. The yield was quantitative. Analysis showed that all the tertiary amino groups had been converted to the quaternary form.

EXAMPLE 2

Preparation of Polymer II

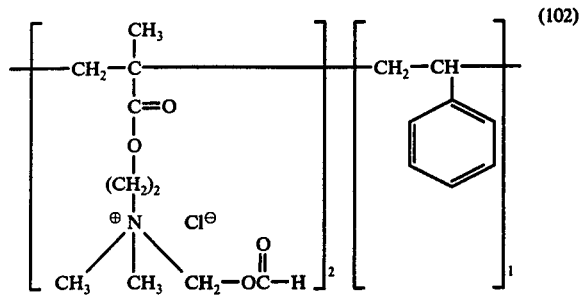

(102)

A copolymer of dimethylaminoethyl methacrylate (D.M.A.E.M.A.) and styrene was prepared having a molecular weight of about 10,000 and a dimethylaminoethyl methacrylate/styrene ratio of 2:1.3. 38 g (equivalent to 0.01 mol of D.M.A.E.M.A.) of this polymer was dissolved in tetrahydrofuran (40 ml) which had been dried over sodium and redistilled. The stirred solution was cooled to 5° C in an ice/water bath. Chloromethyl formate (1.1 g) in tetrahydrofuran (10 ml) was dropped in over a period of 15 minutes, after a further 15 minutes stirring the precipitated product was filtered off, washed with dry diethyl ether and dried under vacuo in a desiccator. The yield was quantitative.

Analysis: Found (percent): C,55.80; H,8.23; N,4.37; Cl,12.35. Calculated (percent): C,55.35; H,7.25; N,4.61; Cl,11.70.

To provide comparative tests for the use Example the following polymers were made:

Polymer III

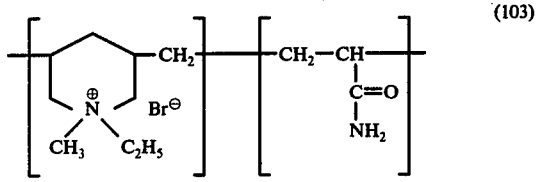

(103)

This polymer was made following the first part of the preparation set forth in Example 1. Thereafter it was quaternised with bromoethane.

Polymer IV

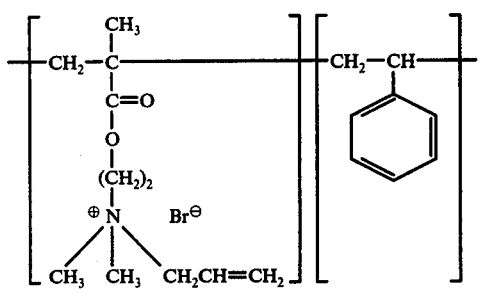

(104)

This polymer was made following the first part of the preparation set forth in Example 2. Thereafter it was quaternised with allyl bromide as described in Example 2 of U.S.P. 3756819.

EXAMPLE 3

(Use Example)

Four coating solutions were prepared. In solution I 2.5 g of polymer I in 90 ml of water was mixed with 12 g of photographic gelatin in 180 ml of water at 30° C. To this mixture was added 30 ml of a 4% by weight solution of the dye of the formula

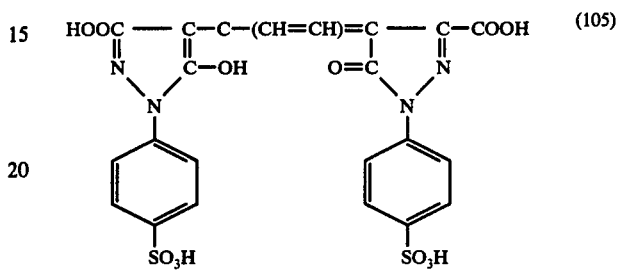

(105)

Solution II was similar but contained instead of 2.5 g of polymer I 2.5 g of polymer II. Solution III was similar but contained instead of 2.5 g of polymer I, 2.5 of polymer III. Solution IV was similar but contained instead of 2.5 g of polymer I, 2.5 g of polymer IV.

A portion of each of the solutions I to IV was coated onto subbed polyester film base and dried.

When the coatings were immersed in distilled water for 60 minutes no bleeeding of the dye was observed from any of the layers. However when the layers were immersed in a bath (at 20° C) containing 5 g of sodium carbonate per 100 ml of water the dye was seen to bleed rapidly from the coatings made from Solution I and II.

In fact all the dye was removed from these two coatings in 10 seconds. However substantially no dye was removed from the coatings made using solutions III and IV even after 1 hour immersion in the sodium carbonate solution.

In an extention to this test a further portion of each of the solutions I to IV was coated on to subbed polyester film base and dried. Over each of these coated layers was then coated a layer of a silver iodo-bromide photographic emulsion. Each of the layers were then dried. Each of these samples was then immersed in a 5% sodium carbonate solution. In the case of the samples made from solutions I and II rapid bleeding of the dye occurred and substantially all the dye had bled out of these two samples in 15 seconds. In the case of the samples made from solutions III and IV again no bleeding of the dye occurred even after a 1 hour immersion in the carbonate solution.

This shows that the polymeric compounds of the present invention act as efficient alkali-release mordants.

I claim:

1. A polymeric material which comprises repeating units of the formulae (A) 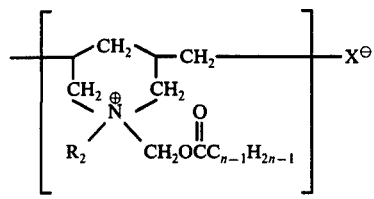

wherein $R_2$ is alkyl of 1 to 7 carbon atoms, X is a chloride or bromide anion and $n$ is an integer of 1 to 15, (B) 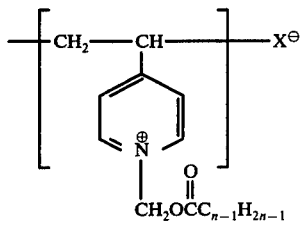

wherein X is a chloride or bromide anion and $n$ is an integer of 1 to 15, or (C) 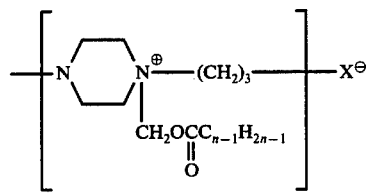

wherein X is a chloride or bromide anion and $n$ is an integer of 1 to 15.

2. Polymeric material according to claim 1 wherein $n$ is 1.

3. Polymeric material of claim 1, which comprises repeating units of the formula

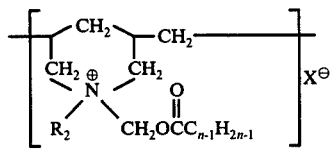

wherein $R_2$ is alkyl of 1 to 7 carbon atoms, X is a chloride or bromide anion and $n$ is an integer of 1 to 15.

4. Polymeric material of claim 1, which comprises repeating units of the formula

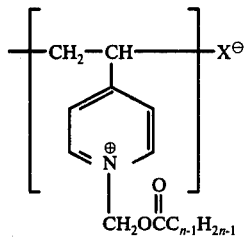

wherein X is a chloride or bromide anion and $n$ is an integer of 1 to 15.

5. Polymeric material of claim 1, which comprises repeating units of the formula

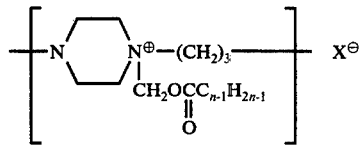

wherein X is a chloride or bromide anion and $n$ is an integer of 1 to 15.

6. Polymeric material of claim 3 which comprises repeating units of the formula

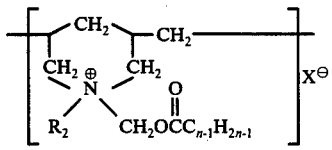

wherein $R_2$ is alkyl of 1 to 7 carbon atoms, X is a chloride or bromide anion and $n$ is an integer of 1 to 15, and repeating units derived from acrylic or methacrylic acid, their esters or amides.

7. A combination of an anionic dye mordanted by a polymeric material as claimed in claim 1.

8. A polymer according to claim 6 of the formula

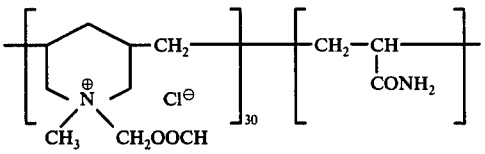

* * * * *